United States Patent
Kennedy

(10) Patent No.: US 9,341,167 B2
(45) Date of Patent: May 17, 2016

(54) VEHICLE SPEED DETECTION MEANS FOR POWER GENERATION SYSTEM

(71) Applicant: Kinetic Energy Corporation, Columbia, MD (US)

(72) Inventor: Eugene J. Kennedy, Philadelphia, PA (US)

(73) Assignee: Kinetic Energy Corporation, Columbia, MD (US)

( * ) Notice: Subject to any disclaimer, the term of this patent is extended or adjusted under 35 U.S.C. 154(b) by 0 days.

(21) Appl. No.: 13/914,559

(22) Filed: Jun. 10, 2013

(65) Prior Publication Data

US 2014/0152023 A1 Jun. 5, 2014

Related U.S. Application Data

(63) Continuation of application No. 12/695,143, filed on Jan. 27, 2010, now Pat. No. 8,471,395, and a continuation of application No. 12/695,132, filed on Jan. 27, 2010, now Pat. No. 8,461,700, and a (Continued)

(51) Int. Cl.
*F02B 63/04* (2006.01)
*F03G 7/08* (2006.01)
*H02K 7/18* (2006.01)

(52) U.S. Cl.
CPC . *F03G 7/08* (2013.01); *Y10T 307/50* (2015.04)

(58) Field of Classification Search
CPC ............ F03G 7/08; H02K 7/1853; E01C 9/00
USPC ................ 290/1 R, 1 C; 404/71; 180/2.1, 2.2
See application file for complete search history.

(56) References Cited

U.S. PATENT DOCUMENTS

| 1,312,131 A | 8/1919 | Morton |
| 1,771,200 A | 7/1930 | Akers |
| 1,916,873 A | 7/1933 | Wiggins |
| 3,748,443 A | 7/1973 | Kroll et al. |

(Continued)

FOREIGN PATENT DOCUMENTS

| CH | 1986/007504 A1 | 12/1986 |
| CN | 201045331 Y | 4/2008 |

(Continued)

OTHER PUBLICATIONS

National Search Report CN2010800146126 dated Aug. 6, 2013.

(Continued)

*Primary Examiner* — Hae Moon Hyeon
(74) *Attorney, Agent, or Firm* — John J. Dresch; Dresch IP Law, PLLC

(57) ABSTRACT

A vehicle energy harvester including a subunit having an upper surface forming a roadway surface; a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface; a generator that generates power in response to movement of the vehicle activated treadle; and a vehicle speed detection device that detects a speed of a vehicle travelling over the roadway surface based on a speed of movement of the vehicle activated treadle.

16 Claims, 4 Drawing Sheets

Related U.S. Application Data continuation of application No. 12/695,136, filed on Jan. 27, 2010, now Pat. No. 8,461,701, and a continuation of application No. 12/695,139, filed on Jan. 27, 2010, now Pat. No. 8,466,570, and a continuation of application No. 12/695,146, filed on Jan. 27, 2010, now Pat. No. 8,466,571, and a continuation of application No. 12/695,148, filed on Jan. 27, 2010, now Pat. No. 9,212,654.

(60) Provisional application No. 61/147,747, filed on Jan. 27, 2009, provisional application No. 61/147,748, filed on Jan. 27, 2009, provisional application No. 61/147,749, filed on Jan. 27, 2009, provisional application No. 61/147,750, filed on Jan. 27, 2009, provisional application No. 61/147,752, filed on Jan. 27, 2009, provisional application No. 61/147,754, filed on Jan. 27, 2009.

(56) References Cited

U.S. PATENT DOCUMENTS

| | | |
|---|---|---|
| 3,859,589 A | 1/1975 | Rush |
| 3,885,163 A | 5/1975 | Toberman |
| 3,918,844 A | 11/1975 | Bailey |
| 3,944,855 A | 3/1976 | Le Van |
| 4,004,422 A | 1/1977 | Le Van |
| 4,081,224 A | 3/1978 | Krupp |
| 4,115,034 A | 9/1978 | Smith |
| 4,130,064 A | 12/1978 | Bridwell |
| 4,211,078 A | 7/1980 | Bass |
| 4,212,598 A | 7/1980 | Roche et al. |
| 4,228,360 A | 10/1980 | Navarro |
| 4,238,687 A | 12/1980 | Martinez |
| 4,239,974 A | 12/1980 | Swander et al. |
| 4,239,975 A | 12/1980 | Chiappetti |
| 4,247,785 A | 1/1981 | Apgar |
| 4,250,395 A | 2/1981 | Lundgren |
| 4,309,150 A | 1/1982 | Payne |
| 4,322,673 A | 3/1982 | Dukess |
| 4,339,920 A | 7/1982 | Le Van |
| 4,409,489 A | 10/1983 | Hayes |
| 4,418,542 A | 12/1983 | Ferrell |
| 4,434,374 A | 2/1984 | Lundgren |
| 4,437,015 A | 3/1984 | Rosenblum |
| 4,614,875 A | 9/1986 | McGee |
| 4,700,540 A | 10/1987 | Byrum |
| 4,739,179 A | 4/1988 | Stites |
| 4,912,995 A | 4/1990 | Otters |
| 4,915,196 A | 4/1990 | Krisko |
| 4,944,474 A | 7/1990 | Jones |
| 4,980,572 A | 12/1990 | Sen |
| 5,119,136 A | 6/1992 | Morikawa |
| 5,157,922 A | 10/1992 | Baruch |
| 5,250,769 A | 10/1993 | Moore |
| 5,347,186 A | 9/1994 | Konotchick |
| 5,355,674 A | 10/1994 | Rosenberg |
| 5,449,909 A | 9/1995 | Kaiser et al. |
| 5,634,774 A | 6/1997 | Angel et al. |
| 5,648,645 A | 7/1997 | Arpagaus et al. |
| 5,678,933 A | 10/1997 | Ouchi et al. |
| 5,977,742 A | 11/1999 | Henmi |
| 5,984,432 A | 11/1999 | Otomo et al. |
| 6,023,134 A | 2/2000 | Carl et al. |
| 6,091,159 A | 7/2000 | Galich |
| 6,116,704 A | 9/2000 | Nakakita et al. |
| 6,172,426 B1 | 1/2001 | Galich |
| 6,204,568 B1 | 3/2001 | Runner |
| 6,353,270 B1 | 3/2002 | Sen |
| 6,362,534 B1 | 3/2002 | Kaufman |
| 6,376,925 B1 | 4/2002 | Galich |
| 6,467,266 B1 | 10/2002 | Kanazawa et al. |
| 6,494,144 B1 | 12/2002 | Perez Sanchez |
| 6,580,177 B1 | 6/2003 | Hagood et al. |
| 6,662,099 B2 | 12/2003 | Knaian et al. |
| 6,718,760 B1 | 4/2004 | Padera |
| 6,734,575 B2 | 5/2004 | Ricketts |
| 6,756,694 B2 | 6/2004 | Ricketts |
| 6,767,161 B1 | 7/2004 | Calvo et al. |
| 6,812,588 B1 | 11/2004 | Zadig |
| 6,858,952 B2 | 2/2005 | Gott et al. |
| 6,894,233 B2 | 5/2005 | Dingwall et al. |
| 6,936,932 B2 | 8/2005 | Kenney |
| 6,969,213 B2 | 11/2005 | Rastegar et al. |
| 7,043,904 B2 | 5/2006 | Newman |
| 7,067,932 B1 | 6/2006 | Ghassemi |
| 7,102,244 B2 | 9/2006 | Hunter, Jr. |
| 7,145,257 B2 | 12/2006 | Ricketts |
| 7,148,581 B2 | 12/2006 | Hershey et al. |
| 7,239,031 B2 | 7/2007 | Ricketts |
| 7,315,088 B2 | 1/2008 | Erriu |
| 7,347,643 B2 | 3/2008 | Jeong |
| 7,371,030 B2 | 5/2008 | Hickman |
| 7,429,145 B2 | 9/2008 | Rastegar et al. |
| 7,541,684 B1 | 6/2009 | Valentino |
| 7,589,428 B2 | 9/2009 | Ghassemi |
| 7,629,698 B2 | 12/2009 | Horianopoulos et al. |
| 7,687,931 B2 | 3/2010 | Gasendo |
| 7,714,456 B1 | 5/2010 | Daya |
| 7,717,043 B2 | 5/2010 | Rastegar et al. |
| 8,164,204 B2 * | 4/2012 | Jang ............................ 290/1 R |
| 8,872,363 B2 * | 10/2014 | Almalki ........................ 290/1 R |
| 2002/0014314 A1 | 2/2002 | Miller |
| 2003/0132636 A1 | 7/2003 | Ricketts |
| 2003/0151381 A1 | 8/2003 | Kadota et al. |
| 2004/0066041 A1 | 4/2004 | Hunter, Jr. |
| 2005/0116545 A1 | 6/2005 | Hamel et al. |
| 2005/0143876 A1 | 6/2005 | Tanase |
| 2005/0200132 A1 | 9/2005 | Kenney |
| 2005/0268444 A1 | 12/2005 | Namerikawa et al. |
| 2006/0152008 A1 | 7/2006 | Ghassemi |
| 2006/0237968 A1 | 10/2006 | Chandrasekaran |
| 2007/0018803 A1 | 1/2007 | Lang |
| 2007/0020047 A1 | 1/2007 | Adair |
| 2007/0085342 A1 | 4/2007 | Horianopoulos et al. |
| 2007/0158945 A1 | 7/2007 | Annen et al. |
| 2007/0210652 A1 | 9/2007 | Tracy et al. |
| 2007/0264081 A1 | 11/2007 | Chiu |
| 2008/0224477 A1 | 9/2008 | Kenney |
| 2009/0315334 A1 | 12/2009 | Chen |

FOREIGN PATENT DOCUMENTS

| | | |
|---|---|---|
| CN | 201050452 Y | 4/2008 |
| CN | 201396254 Y | 2/2010 |
| JP | 2000310102 A | 11/2000 |
| JP | 2002161848 A | 6/2002 |

OTHER PUBLICATIONS

National Search Report CN2010800146145 dated Jul. 26, 2013.
National Search Report CN2009801552247 dated Mar. 19, 2013.
Lee W. Young, International Search Report, PCT/US2009/066024 Apr. 2, 2010, p. 2, Alexandria, VA, US.
Blaine R. Copenheaver, International Search Report, PCT/US2009/066025 Mar. 10, 2010, p. 2, Alexandria, VA, US.
Lee W. Young, International Search Report, PCT/US2010/022287 Jun. 1, 2010, p. 2, Alexandria, VA, US.
Blaine R. Copenheaver, International Search Report, PCT/US2010/022288 Jul. 12, 2010, p. 2, Alexandria, VA, US.
Lee W. Young, International Search Report, PCT/US2010/022289 Jun. 1, 2010, p. 2, Alexandria, VA, US.
Lee W. Young, International Search Report, PCT/US2010/022291 Jun. 15, 2010, p. 2, Alexandria, VA, US.
Blaine R. Copenheaver, International Search Report, PCT/US2010/022294 Jun. 28, 2010, p. 2, Alexandria, VA, US.
Blaine R. Copenheaver, International Search Report, PCT/US2010/022296 Jul. 29, 2010, p. 2, Alexandria, VA, US.
Lee W. Young, International Search Report, PCT/US2010/020676 Jun. 15, 2010, p. 2, Alexandria, VA, US.

* cited by examiner

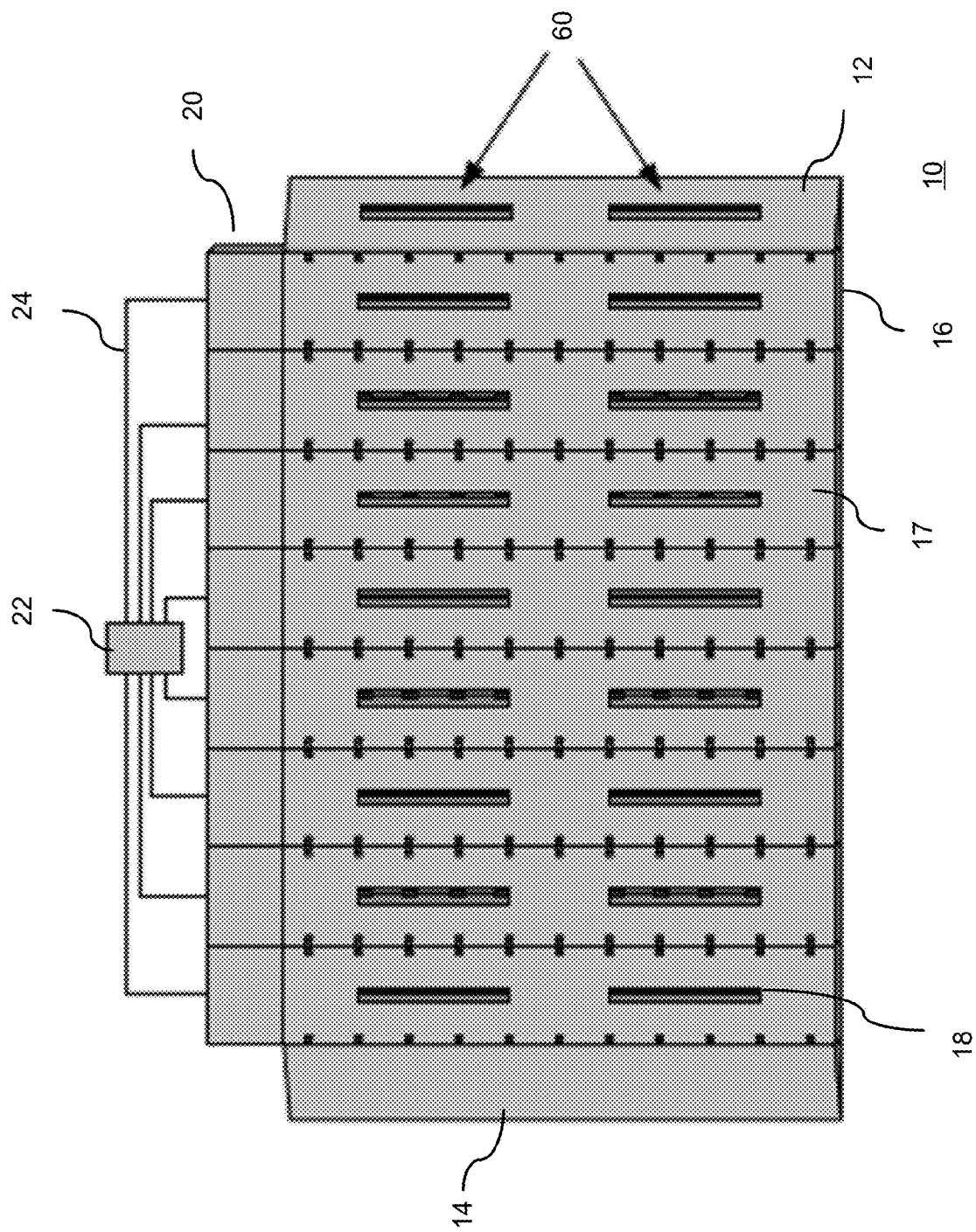

VEHICLE SPEED DETECTION MEANS FOR POWER GENERATION SYSTEM

CROSS-REFERENCE TO RELATED APPLICATIONS

The present invention claims the benefit of U.S. Provisional Patent Application No. 61/147,747, filed Jan. 27, 2009, and entitled "TRANSIENT ABSORBER FOR POWER GENERATION SYSTEM", U.S. Provisional Patent Application No. 61/147,748, filed Jan. 27, 2009, and entitled "WEATHER RESPONSIVE TREADLE LOCKING MEANS FOR POWER GENERATION SYSTEM", U.S. Provisional Patent Application No. 61/147,749, filed Jan. 27, 2009, and entitled "LOW PROFILE, SURFACE-MOUNTED POWER GENERATION SYSTEM", U.S. Provisional Patent Application No. 61/147,750, filed Jan. 27, 2009, and entitled "VEHICLE SPEED DETECTION MEANS FOR POWER GENERATION SYSTEM", U.S. Provisional Patent Application No. 61/147,752, filed Jan. 27, 2009, and entitled "RECIPROCAL SPRING ARRANGEMENT FOR POWER GENERATION SYSTEM", and U.S. Provisional Patent Application No. 61/147,754, filed Jan. 27, 2009, and entitled "LOSSLESS SHORT-DURATION ELECTRICAL STORAGE MEANS FOR POWER GENERATION SYSTEM", the entire contents of which are incorporated herein by reference in their entirety.

FIELD OF THE INVENTION

The present invention is directed toward devices and methods of harvesting vehicle energy, and more specifically, toward a vehicle speed detection means for harvesting vehicle energy.

SUMMARY OF THE INVENTION

These problems and others are addressed by the present invention, which provides a novel vehicle energy harvester that overcomes many of the issues with the conventional devices and is therefore better suited for real-world implementation than the conventional devices.

The exemplary embodiments of the invention make productive use of the energy that is normally wasted (in the form of heat) in reducing the speed of motor vehicles on exit ramps, toll plazas etc., etc. The vehicle energy harvester can absorb mechanical energy from passing (or breaking) vehicles and convert the mechanical energy to electrical energy using, for example, shaft driven generators.

The disclosed embodiments provide a vehicle energy harvester and power generation system that is simple to install, provides a short payback period, and has a scalable configuration. More particularly, the disclosed embodiments can provide a simple and reliable mechanical configuration that can withstand sever environments. The low cost configuration of the system may provide for faster payback of the expense of the system, and therefore, make the system more practical and desirable for practical applications.

Additionally, the ease with which the system can be installed also may make the system more practical and desirable for practical applications. The disclosed embodiments require little or no excavation and can be installed in a few hours, instead of over several days as with conventional devices.

The disclosed embodiment also can provide a scalable configuration that may be particularly advantageous for use at locations, such as exits ramps, toll plazas, hills, among other locations.

Furthermore, the exemplary embodiments can include a vehicle speed sensor. The embodiments can provide important advantages. For example, the exemplary unit can be used on exit ramps and other traffic lanes where motor vehicles approaching at a high rate of speed are required to reduce speed to comply with local road/traffic conditions. In normal operation, the disclosed embodiments can absorb a small portion of a vehicle's kinetic energy and convert it to electrical energy. In cases where slower moving vehicles are traveling at or below the local speed limit on the exit ramp, it may be desirable to allow such vehicles to pass unimpeded and not slow them any further.

An exemplary embodiment of the invention is directed to, for example, a vehicle energy harvester including a subunit having an upper surface forming a roadway surface, a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, and a vehicle speed detection device that detects a speed of a vehicle travelling over the roadway surface based on a speed of movement of the vehicle activated treadle.

Another exemplary embodiment of the invention is directed to, for example, a vehicle energy harvester comprising a plurality of subunits each having an upper surface forming a roadway surface, a vehicle activated treadle on at least one of the plurality of subunits, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, and a vehicle speed detection device that detects a speed of a vehicle travelling over the roadway surface based on a speed of movement of the vehicle activated treadle.

Another exemplary embodiment of the invention is directed to, for example, a vehicle energy harvester comprising a subunit having an upper surface forming a roadway surface, a vehicle activated treadle on the subunit, the vehicle activated treadle moveable between a first position in which an upper surface of the treadle is at an angle with respect to the upper surface of the roadway surface and a second position in which the upper surface of the treadle is flush with the upper surface of the roadway surface, a generator that generates power in response to movement of the vehicle activated treadle, and vehicle speed detection means for detecting a speed of a vehicle travelling over the roadway surface based on a speed of movement of the vehicle activated treadle.

BRIEF DESCRIPTION OF THE DRAWINGS

These and other aspects and features of embodiments of the present invention will be better understood after a reading of the following detailed description, together with the attached drawings, wherein:

FIG. 4 is a schematic top view of a vehicle energy harvester having vehicle speed detection means.

DETAILED DESCRIPTION

Figure 1:
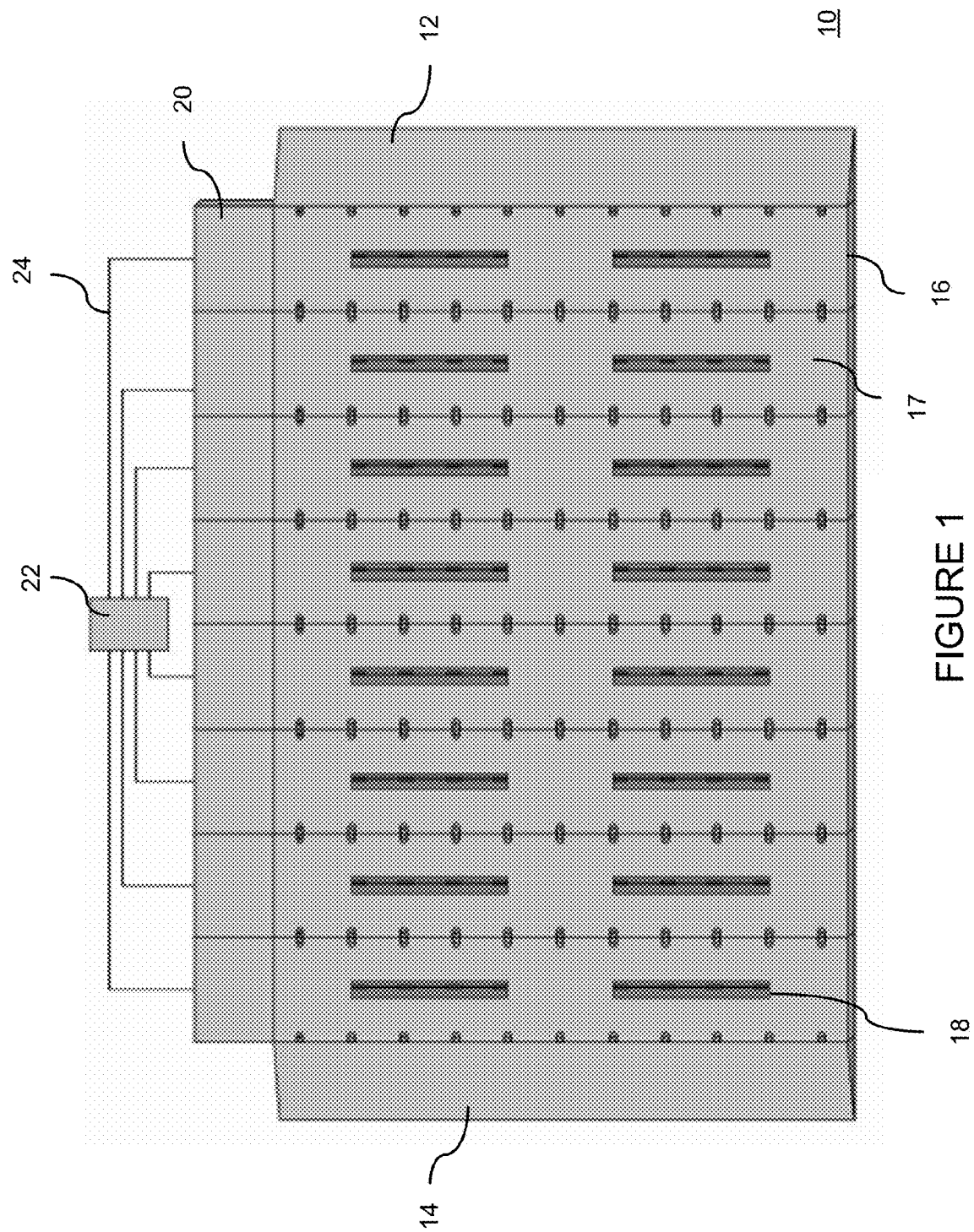
FIG. 1 is a schematic top view of a power absorber unit of a vehicle energy harvester.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, FIGS. 1-4 illustrate an exemplary vehicle energy harvester 10.

The exemplary embodiments can make productive use of the energy that is normally wasted (in the form of heat) in reducing the speed of motor vehicles on exit ramps, toll plazas etc., etc. The vehicle energy harvester 10 can absorb mechanical energy from passing (or breaking) vehicles and convert the mechanical energy to electrical energy using, for example, shaft driven generators. Other means for converting the mechanical energy to electrical energy also are contemplated. In an exemplary embodiment, the electric power from the generators can be converted, metered, and fed into the commercial power grid. In another exemplary embodiment, each site can be equipped with wireless communications to monitor the status and/or output of the system.

Power Absorber Configuration

The disclosed embodiments can include individual assemblies with integral generators. Other generator configurations also are possible, such as separate generators.

As shown in FIG. 1, the vehicle energy harvester unit 10 can be a low-profile surface mounted assembly. The vehicle energy harvester unit 10 can include an entry ramp 12 and an exit ramp 14. The vehicle energy harvester unit 10 can include a plurality of subunits 16 having a top surface or driving surface 17. Each subunit can include one or more vehicle activated treadles 18. In an embodiment, each subunit 16 can include a generator unit 20.

In other embodiments, the vehicle energy harvester unit 10 can be set into the road surface. The surface mounted assembly may require minimal installation effort. Additionally, the unit count can be scaled to road/breaking needs. In an embodiment, each generator unit 20 can feed a common power summing/conversion unit 22. A simple cable interconnect 24 can be provided to connect each generator unit 20 to the common power summing/conversion unit 22. A fail safe configuration can protect the system against individual unit failures.

Power Conversion Unit

In a disclosed embodiment, the individual absorber units 16 can be connected via cable assemblies 24. The input power can be summed and applied to a low-loss inverter unit. The power can be converted immediately to a form that is transmittable to the power grid. The output can be metered and applied to the power grid for transmission.

Absorber Unit Operation

Figure 2:
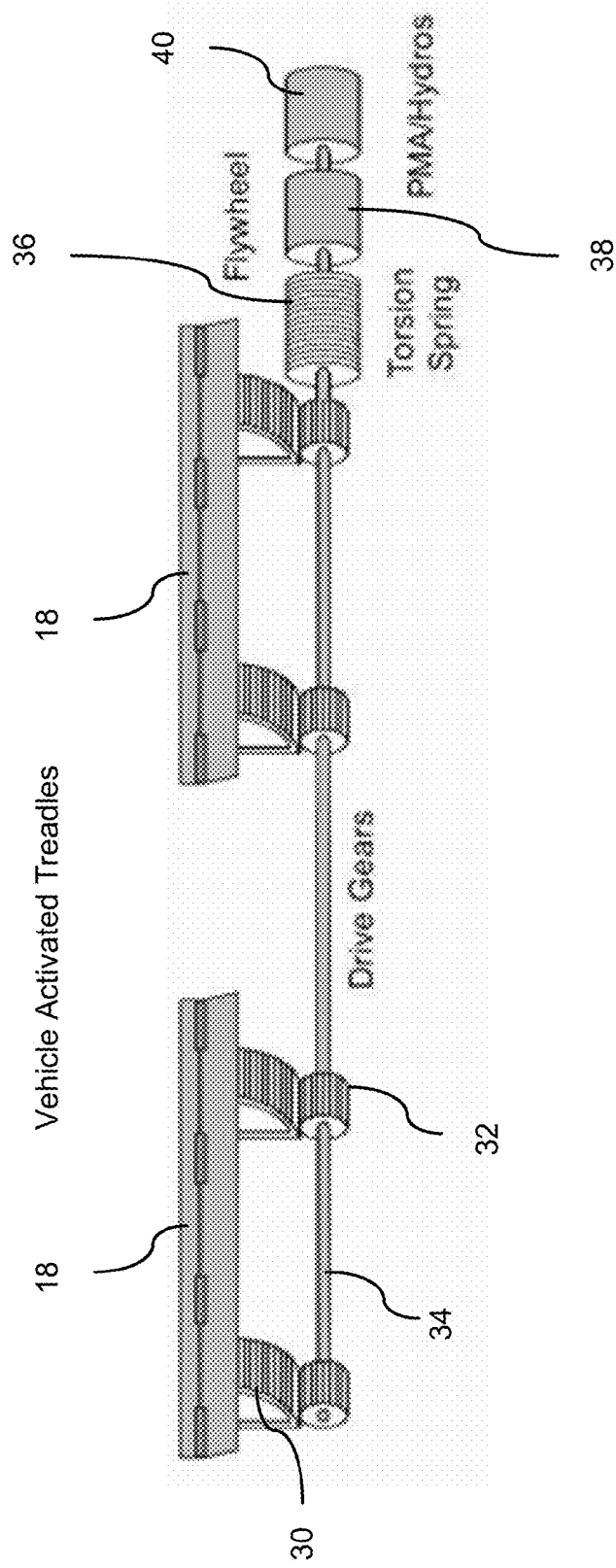
FIG. 2 is a schematic perspective view illustrating a portion of a vehicle energy harvester.

With reference to FIG. 2, an exemplary embodiment of a subunit 16 of a vehicle energy harvester unit 10 can include spring-loaded treadles 18 having a treadles gear 30 engaging a drive gear 32. The drive gear 32 is coupled to a shaft 34. In operation, one or more vehicle tires force the spring-loaded treadles 18 down as they roll over the treadles 18. The treadle gears 30 drive the plurality of drive gears 32, which rotate the shaft 34. The shaft 34 winds a torsion spring 36, thereby absorbing the treadle drive transient. A pawl can lock the shaft 34 as rotation ends. The torsion spring 36 rotates a flywheel 38, thereby spreading the impulse of the treadle drive over time to extend output to a generator 40. The flywheel 38 can turn a generator 40, such as a hydro pump. The generator 40, in turn, can generate electric power for sale/use/storage.

Vehicle Speed Detection Means

Figure 3:
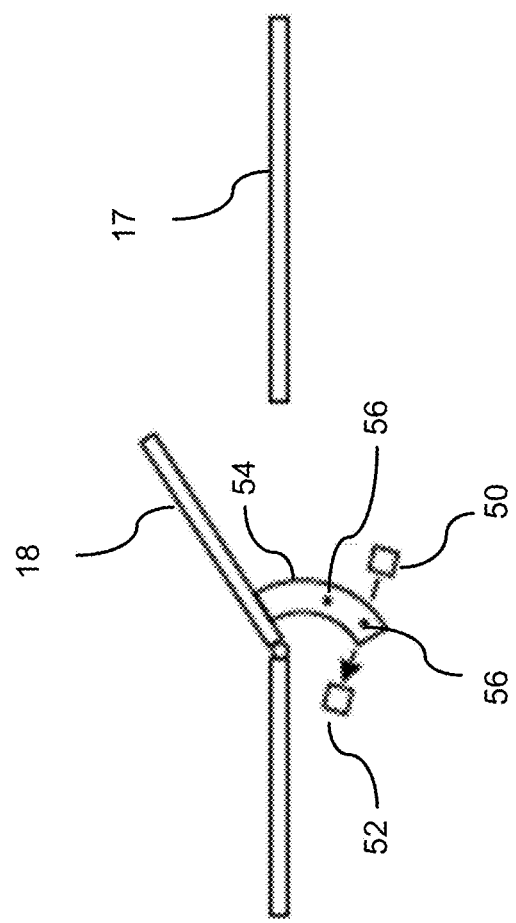
FIG. 3 is a schematic side view of a vehicle energy harvester having vehicle speed detection means.

Referring now to FIGS. 3 and 4, an exemplary embodiment of a vehicle energy harvester 10 having vehicle speed detection means will now be described.

The present invention recognizes that the known conventional devices do not have a means for determining the speed of oncoming vehicles. The embodiments of the invention address and solve these problems and improve the utility of a treadle based energy conversion systems according to the embodiments of the invention.

The exemplary embodiments can provide important advantages in that vehicles traveling faster than the posted speed limit can be slowed by the vehicle energy harvester unit 10 and a portion of the vehicle's kinetic energy can be converted to electricity rather than wasted as heat from the vehicles braking system. Conversely, vehicles traveling at or below the posted speed limit can be allowed to pass unimpeded.

An exemplary embodiment provides a vehicle energy harvester unit 10 that can be used, for example, on exit ramps and other traffic lanes where motor vehicles approaching at a high rate of speed are required to reduce speed to comply with local road/traffic conditions. In normal operation, the embodiments of the vehicle energy harvester unit 10 can absorb a small portion of a vehicle's kinetic energy and convert it to electrical energy. In cases where slower moving vehicles are traveling at or below the local speed limit on the exit ramp, it may be desirable to allow such vehicles to pass unimpeded and not slow them any further. The exemplary vehicle energy harvester unit 10 can be equipped with vehicle speed detection means, such as a vehicle speed sensor or the like, to accomplish this function. Various technologies have been considered and contemplated to perform this function and several examples thereof are illustrated and described in FIGS. 3 and 4.

As shown in FIG. 3, an exemplary embodiment of the vehicle energy harvester unit 10 can include vehicle speed detection means or a vehicle speed detection assembly having, for example, a infrared (IR) emitter 50, an infrared (IR) detector 52, and a rotating arm portion 54 coupled to the treadle 18. Other known devices for detecting the speed of a moving part can be used to detect the velocity of the movement of the treadle.

In operation, the infrared (IR) detector 52 can detect an infrared beam from the infrared (IR) emitter 50. The rotating arm portion 54 can be configured to interpose the infrared (IR) emitter 50 and the infrared (IR) detector 52 during movement of the treadle 18. The rotating arm portion 54 of the treadle 18 can include one or more apertures 56 for permitting the infrared beam emitted from the infrared (IR) emitter 50 to pass through the rotating arm portion 54 of the treadle 18 and be detected by the infrared (IR) detector 52. In operation, as the treadle 18 moves downward, the infrared beam from the infrared (IR) emitter 50 can be broken by the rotating arm portion 54 of the treadle 18 and the disruption of the infrared beam can be detected by the infrared (IR) detector 52. The infrared beam can then be detected again by the infrared (IR) detector 52 as the apertures 56 in the rotating arm portion 54 pass by (i.e. correspond to) the infrared beam. In an embodiment, the time between the beams being detected by the infrared (IR) detector 52 can be used to calculate the speed of the vehicle entering the ramp 12. The speed information can be used by the microcontroller unit (MCU) to engage or disengage one or more of the treadle subunits 16 depending on the calculated speed of the vehicle.

As shown in FIG. 4, an exemplary embodiment of the vehicle energy harvester unit 10 can include one or more treadles 18 on the entry ramp 12. The treadles 18 can include vehicle speed detection means or a vehicle speed detection assembly, for example, as illustrated in FIG. 3. In this manner, the speed of the vehicle entering the ramp 12 can be calculated and the speed information can be used by the microcontroller unit (MCU) to engage or disengage one or more of the treadle subunits 16 depending on the calculated speed of the vehicle.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

What is claimed is:

1. A vehicle energy harvester comprising:
a subunit having an upper surface forming a roadway surface;
a vehicle activated treadle on the subunit, the vehicle activated treadle configured to be moveable between a first position and a second position in response to contact with a part of a vehicle travelling over the roadway surface;
a generator actuated by the movement of the vehicle activated treadle between the first position and the second position to thereby generate power in response to the movement of the vehicle activated treadle between the first position and the second position,
wherein the vehicle activated treadle includes an arm portion coupled to the vehicle activated treadle and moveable with the vehicle activated treadle; and
a vehicle speed detection device that detects a speed of the arm portion of the vehicle activated treadle during the movement and calculates a speed of the vehicle travelling over the roadway surface based on the detected speed of the arm portion of the vehicle activated treadle.

2. The vehicle energy harvester of claim 1, wherein the vehicle speed detection device includes:
an infrared (IR) emitter; and
an infrared (IR) detector,
wherein the arm portion passes between the infrared (IR) emitter and the infrared (IR) detector during the movement of the vehicle activated treadle.

3. The vehicle energy harvester of claim 2, wherein the arm portion includes one or more apertures through which an infrared beam emitted from the infrared (IR) emitter passes through the arm portion and is detected by the infrared (IR) detector.

4. The vehicle energy harvester of claim 2, wherein the arm portion includes two apertures through which an infrared beam emitted from the infrared (IR) emitter passes through the arm portion and is detected by the infrared (IR) detector.

5. The vehicle energy harvester of claim 4, wherein the infrared beam emitted from the infrared (IR) emitter passes through each of the two apertures during movement of the arm portion, a body portion of the arm portion between the two apertures preventing the beam from being detected as the body portion moves between the infrared (IR) emitter and the infrared (IR) detector.

6. The vehicle energy harvester of claim 4, wherein the vehicle speed detection device calculates a speed of the movement of the arm portion of the vehicle activated treadle based on a time between the infrared (IR) detector detecting the beam passing through a first aperture of the two apertures and the infrared (IR) detector detecting the beam passing through a second aperture of the two apertures.

7. The vehicle energy harvester of claim 1, wherein the subunit is an entry ramp of the roadway surface and the entry ramp includes the vehicle speed detection device, the vehicle energy harvester further comprising:
a plurality of subunits each having an upper surface forming the roadway surface; and
a plurality of vehicle activated treadles on the plurality of subunits.

8. The vehicle energy harvester of claim 1, further comprising:
a drive gear mounted on a rotatable shaft, wherein the drive gear is driven by movement of the vehicle activated treadle, and the rotatable shaft is coupled to the generator.

9. The vehicle energy harvester of claim 8, further comprising:
a transient absorption device coupled between the drive gear and the generator.

10. The vehicle energy harvester of claim 9, wherein the transient absorption device is a torsion spring.

11. The vehicle energy harvester of claim 9, wherein the transient absorption device is a flexible link.

12. The vehicle energy harvester of claim 9, further comprising a flywheel coupled between the transient absorption device and the generator.

13. The vehicle energy harvester of claim 8, wherein an upper surface of the vehicle activated treadle is at an angle with respect to the upper surface of the roadway surface when the vehicle activated treadle is moveable between the first position, and
wherein the upper surface of the vehicle activated treadle is flush with the upper surface of the roadway surface when the vehicle activated treadle is moveable between the second position.

14. A vehicle energy harvester comprising:
a plurality of subunits each having an upper surface forming a roadway surface;
a vehicle activated treadle on at least one of the plurality of subunits, the vehicle activated treadle configured to be moveable between a first position and a second position in response to contact with a part of a vehicle travelling over the roadway surface;
a generator actuated by the movement of the vehicle activated treadle between the first position and the second position to thereby generate power in response to the movement of the vehicle activated treadle between the first position and the second position,
wherein the vehicle activated treadle includes an arm portion coupled to the vehicle activated treadle and moveable with the vehicle activated treadle; and
a vehicle speed detection device that detects a speed of the arm portion of the vehicle activated treadle during the movement and calculates a speed of the vehicle travelling over the roadway surface based on the detected speed of the arm portion of the vehicle activated treadle.

15. The vehicle energy harvester of claim 14, further comprising:
a vehicle activated treadle on each of the plurality of subunits; and
a microcontroller unit that selectively engages or disengages one or more of the vehicle activated treadles on the plurality of subunits in response to the speed of the vehicle detected by the vehicle speed detection device to selectively permit the vehicle to pass unimpeded over the roadway surface.

16. A vehicle energy harvester comprising:
a subunit having an upper surface forming a roadway surface;
a vehicle activated treadle on the subunit, the vehicle activated treadle configured to be moveable between a first position and a second position in response to contact with a part of a vehicle travelling over the roadway surface;
a generator actuated by the movement of the vehicle activated treadle between the first position and the second position to thereby generate power in response to the movement of the vehicle activated treadle between the first position and the second position; and
vehicle speed detection means for detecting a speed of the movement of the vehicle activated treadle and calculating a speed of the vehicle travelling over the roadway based on the detected speed of the movement of the vehicle activated treadle.

* * * * *